United States Patent [19]

Kimura et al.

[11] 3,754,925

[45] Aug. 28, 1973

[54] NEW THERMO-GELABLE POLYSACCHARIDE-CONTAINING FOODSTUFFS

[75] Inventors: Hiroshi Kimura, Kyota; Shigehiko Sato; Tstuo Nakagawa, both of Osaka; Hiromi Nakatani, Kyoto; Akihiko Matsukura, Osaka; Takashi Suzuki, Hyogo; Mitsuko Asai; Tsuneo Kanamaru, both of Osaka; Motoo Shibata, Kumamoto; Saburo Yamatodani, Osaka, all of Japan

[73] Assignee: Takeda Chemical Industries, Ltd., Osaka, Japan

[22] Filed: Mar. 22, 1971

[21] Appl. No.: 126,999

[30] Foreign Application Priority Data
Mar. 4, 1970 Japan.............................. 45/24696
Apr. 7, 1970 Japan.............................. 45/29533
Apr. 7, 1970 Japan.............................. 45/29534

[52] U.S. Cl............................ 99/1, 99/17, 99/83, 99/85, 99/92, 99/107, 99/108, 99/109, 99/111, 99/117, 99/123, 99/129, 99/134, 99/136, 99/144, 195/31 P, 195/96, 252/316, 260/209

[51] Int. Cl. ........................... A23l 1/04, C12b 1/00

[58] Field of Search..................... 195/31 P; 99/129, 99/123, 131, 1, 139, 111, 144, 117, 107–109, 134, 136, 17, 18, 83, 85, 92; 252/316; 260/209

[56] References Cited
UNITED STATES PATENTS
3,301,848    1/1967    Hallack ............................ 195/31 P Primary Examiner—Alvin E. Tanenholtz
Assistant Examiner—J. M. Hunter
Attorney—Wenderoth, Lind & Ponack

[57] ABSTRACT

A thermo-gelable $\beta$-1,3 glucan-type polysaccharide is made by the aerobic cultivation of certain microorganisms. It generally resembles the known thermally gelable $\beta$-1,3 glucan known as "curdlan" but possesses definite advantages thereover, particularly when used in the food industry. Also, it may be used advantageously as a substitute for agar in various foods.

7 Claims, No Drawings

NEW THERMO-GELABLE POLYSACCHARIDE-CONTAINING FOODSTUFFS

This invention relates to a new thermo-gelable polysaccharide designated as "PS." More particularly, the invention is concerned with a microbial production of PS, with PS as a new composition of matter exhibiting specific characteristics as well as with its applications in food preparations.

It has been known that a thermally gelable $\beta$-1,3-glucan named "curdlan" is produced by cultivation of a microbial mutant (Strain K) of *Alcaligenes faecalis var. myxogenes* 10C3 (See Agricultural Biological Chemistry, Vol. 30, pages 196 et seq. (1966) by Harada et al).

The present inventors have unexpectedly found, during their study persuing the above-referred achievement by Harada et al, that a mutant (Strain NTK-u) of the *Alcaligenes faecalis var. myxogenes* Strain K can also produce a thermally gelable $\beta$-1,3-glucan-type polysaccharide, but this shows definite physicochemical characteristics which are different from those of said known samples of "curdlan," and that the gel formed by heating an aqueous suspension of the newly found polysaccharide is not only more stable but also superior to the one derived from the known samples of "curdlan" in many other respects for the application to food industries. The present inventors have also revealed that other micro-organisms such as *Agrobacterium radiobacter* can also produce such new polysaccharide that shows substantially the same physicochemical properties as the one produced by said mutant Strain NTK-u in similar ways. In this specification, therefore, the new polysaccharide having the definite characteristics detailed below will be referred to as "PS" as a whole in contrast to the known samples of "curdlan" for avoiding confusion.

The present invention will be described below in the order of "Production of PS," "Characteristics of PS" and "Application of PS to Food Preparation." Throughout the specifications, "kilogram(s)," "gram(s)," "milligram(s)," "microgram(s)," "liter(s)," "milliliter(s)," "centimeter(s)," "square centimeter(s)," "normal concentration(s)," "rotations or rounds per minute," "second(s)," and "minute(s)" may be abbreviated as "kg.," "g.," "mg.," "mcg.," "L.," "ml.," "cm.," "cm²," "N," "rpm.," "sec." and "min.," respectively.

The principal object of the present invention is therefore to provide the newly found thermo-gelable polysaccharide PS.

Another object of this invention is to provide method for producing the PS by means of cultivation of a micro-organism and subsequent purification of the metabolite.

Further object is to provide improvement in production of foodstuffs by the use of the PS as a food additive or as a food material.

Further object is directed to such foodstuffs that are improved in qualities as well as in palatability by the incorporation of the PS during the course of preparation of the foodstuffs.

PRODUCTION OF PS

For the production of PS, a PS-producing microorganism is aerobically cultivated in a culture medium containing assimilable carbon and nitrogen sources with other nutrients required by the microorganism. Some examples of the PS-producing microorganisms are, as briefly stated in the foregoing, as follows:

Agrobacterium radiobacter ATCC-6466

This strain is available from Americal Type Culture Collection under the accession number of ATCC-6466. Its subculture is deposited at Institute for Fermentation, Osaka, Japan under the accession number of "IFO-13127."

Agrobacterium radiobacter Strain U-19

This strain is a mutant derived from the parent Strain IFO-13127 by irradiation of ultraviolet rays in an conventional manner, and has a unique property that it produces substantially no polysaccharide other than PS. A subculture of this strain has been deposited with Insitute for Fermentation, Osaka, Japan under the accession number of "IFO-13126."

Alcaligenes faecalis var myxogenes Strain NTK-u

This strain was obtained by treating the above-referred Strain K with N-methyl-N'-nitro-N-nitrosoguanidine, and shows the following morphological and physiological characteristics, which were observed according to the methods described in "Manual of Microbiological Method" by Society of American Bacteriologists, published by McGraw-Hill Book Co., Inc. in 1957:

1. Morphological characteristics

Microscopic observations (growth on agar slant, 28°C, 48 hours):

Shape: short rods occurring singly or in pairs; occasionally in threes or branched; non-sporulating.

Motility: motile.

Size: 0.3 to 0.5 micron by 0.8 to 1.0 micron.

Gram staining: negative.

2. Cultural characteristics

1. Nutrient broth:

Surface growth: pellicule formed, weak growth, with moderate sediment.

2. Agar slant:

Moderate growth, filiform. Grayish white or cream colored, with smooth, glistening surface. Color of medium unchanged.

3. Gelatin stab:

Good growth on surface, papillate.

4. Boullion agar plate:

Circular, 1.2 to 1.4 mm. in diameter; smooth, glistening surface; slightly translucent; entire; convex or capitate; grayish white or cream.

5. Glucose-inorganic salts agar plate: containing 30 mcg./ml. of uracil, 28°C, 72 hours:

Circular colonies, 0.6 to 0.8 mm. in diameter; smooth, glistening surface; translucent; entire, capitate, grayish white.

3. Physiological characteristics:

1. Temperature for growth: 15° to 40°C; optimum, 28° to 32°C.
    2. pH for growth: pH 4.7 to 9.7; optimum, pH 6 to 7.
    3. Relation to free oxygen: aerobic.
    4. Gelatin: not liquefied.
    5. Litmus milk: Slightly alkaline; not coagulated; no reduction.
    6. Indole: not produced.
    7. Hydrogen sulfide: not produced.
    8. Nitrates: reduced to nitrites.
    9. Ammonia: slightly produced.
    10. Methyl red test: negative.
    11. Voges-Proskauer test: negative.

12. Starch: not hydrolized.
13. Catalase: produced.
14. Citric acid: slightly utilized.
15. Ammonium salts, nitrates and urea are utilized as sole nitrogen sources.

The foregoing observations indicate that, whereas the parent Strain K is substantially not different from the new mutant Strain NTK-u in morphological and cultural characters as well as in physiological properties, the two strains are clearly differentiated in that Strain NTK-u requires uracil for its growth and does not hydrolyze starch. A subculture of the Strain NTK-u has been deposited as a specimen at Institute for Fermentation, Osaka, Japan, under the accession number "IFO-13140."

Respective specimens of the Strain U-19 and the Strain NTK-u have further been deposited in American Type Culture Collection with the accession numbers ATCC-21679 and ATCC-21680.

Suitable carbon sources for the cultivation of those microorganisms are exemplified by glucose, sucrose, galactose, mannose, fructose, xylose, sorbitol, maltose, ribose, dextrin, starch hydrolyzates, glyceral as well as organic acids such as succinic acid, fumaric acid or their salts. The concentration of such carbon sources in the culture media may be variable within the range which permits adequate growth of the particular microorganism used, that is to say, which ensures a high production of the desired polysaccharide. Generally speaking, however, the preferred concentration for the strains of *Agrobacterium radiobacter* lies somewhere between 2 percent and 8 percent, while *Alcaligenes faecalis var. myxogenes* Strain NTK-u can be cultivated successfully between 2 percent and 12.5 percent.

As the nitrogen sources, inorganic ammonium salts (e.g. ammonium sulfate, ammonium phosphates, ammonium chloride or the like) and nitrates (e.g. potassium nitrate, sodium nitrate, ammonium nitrate or the like) may be effectively employed. Furthermore, significant yields of the desired polysaccharide are obtainable by the addition of suitable amounts of organic nitrogen sources such as urea, yeast extract, meat extract, fish extract, corn steep liquor, corn gluten, soybean meal or the like.

The useful inorganic salts as nutrients are those boiled noodles conventionally employed for the cultivation of microorganisms, including, for example, potassium phosphates, sodium phosphates as well as the sulfates, chlorides, carbonates, etc. of manganese, iron, magnesium, calcium, zinc, cobalt and so forth.

If desired, such trace growth promoters as vitaminaceous materials, nucleic acid-related compounds and so forth may be incorporated in the culture medium.

One thing to be noted in case of Strain NTK-u is that, since this strain requires uracil for its growth, it it necessary to incorporate an adequate amount of uracil in the culture medium. But the required amount is as minute as 50 to 1,000 mcg./ml., the use of such organic nitrogen sources as yeast extract, dry yeast and the like will satisfies the auxotrophic requirement because they usually contain uracil or uracil precursors.

Although the preferred cultural conditions vary with different strains employed, cultivation of the main culture for the production is generally effected at pH about 5 to 8 at a temperature of 20° to 35°C for 2 to 4 days, using such cultivation means as shake culture or submerged culture. For example, the preferred cultivation temperature for the NTK-u strain is about 25° to 35°C, while that for the strains of *Agrobacterium radiobacter* is about 20° to 32°C.

An improved growth of the organism and an increased yield of PS will be attained by the addition of calcium carbonate in an amount of 0.1 percent to 0.5 percent to the culture medium to prevent it from leading to excessive acidity or, alternatively, by the addition of an aqueous alkali solution or an aqueous ammonia in the course of cultivation to maintain the medium within the range of pH 5 to 8, preferably pH about 5.5 to about 6.5.

The cultivation is usually to be aerobic. But it is noteworthy that, when Strain NTK-u is employed, a limited supply of oxygen to the culture environment may result in increased yields of PS. To restrict the supply of oxygen, an internal pressure of not higher than 0.05 kg/cm$^2$ over atmospheric pressure is applied to the tank fermentor. Under these conditions, PS can be profitably produced by submerged culture with the aid of agitation at a speed higher than the one used in ordinary cultivation.

The new polysaccharide PS thus produced usually occurs predominantly extracellulary and as water-insoluble particles intermingled with insoluble contaminants. To separate PS from the culture broth, advantage may be taken of combinations of the techniques which are per se known means for separation and purification of water-insoluble polysaccharides. By way of illustration there may be employed such techniques as dissolution, filtration, precipitation (e.g. by neutralization, salting out or the like), desalting (e.g. by permselective dialysis, reverse deionization or the like), liquid-solid separation (e.g. by compression, centrifugation or the like), drying (e.g. by spray drying, lyophilization or the like), powdering etc. To recover the PS in good yield without adversely affecting its characteristics, it is necessary to treat the same under conditions lenient to its physical properties. The following procedure involving the use of an alkali, for instance, most suits the purpose.

At the broth temperature of 25° ± 3°C, there is added not less than lg. of sodium hydroxide per g. of the PS contained. Based on a given volumn of the broth, several volumes of water is added. With the alkali concentration of the system being maintained at approximately 0.1 to 1.5N, preferably applied 0.25 to 0.4 N, the system is stirred gently for a few hours to allow PS to swell. Then, several volumes of water is further added and the mixture is stirred to effect dispersion of PS and, accordingly, to complete the dissolution of the same. The system is filtered under suction or compression, if desired, with the use of a filter aid to remove the insolubles. To the resulting filtrate, there is added an acid while the temperature of the system is kept from raising beyond 30°C, whereby both neutralization and salting out are effected. The above procedures give a jelly-fish form of PS. This jelly is slightly heavier than water and, by taking advantage of this difference in specific gravity, the system is centrifuged at a low temperature (e.g. not higher than 15°C), whereby the jelly is separated from the salt solution. The jelly is further washed with additional water and subjected to centrifugation to be concentrated. Alternatively, it is desalted by the use of a permselective membrane or by reverse deionization at a low temperature (e.g. not higher than 25°C) and, then, with the addition of water, is washed and concentrated on a centrifugal machine at a low temperature as mentioned above. The flocculent PS which is substantially free of contaminants and which has a few percentage points of the PS content is dehydrated and powdered by the use of several volumes of acetone, or spray-dried to instantly obtain a powder of 7 percent or less water content. Alternatively, the above flocculent product is lyophilized and dried in vacuo at a low temperature of not higher than 30°C to obtain a dry powder of 7 percent or less water content.

EXAMPLE A-1

A loopful of a slant culture of *Agrobacterium radiobacter* (IFO-13127) is inoculated in 30 ml. of an aqueous culture medium charged in a 200 ml.-flask, the medium being composed of glucose (5%), $(NH_4)_2HPO_4$ (0.1%), yeast extract (0.5%), $KH_2PO_4$ (0.1%), $MgSO_4·7H_2O$ (0.05%) $FeSO_4·7H_2O$ (0.005%), $MnSO_4·7H_2O$ (0.002%), $ZnCl_2$ (0.001%), $CoCl_2$ (0.001%) and water and being adjusted at pH 7.2. Cultivation is effected under shaking at 28°C for 4 days.

The resulting viscous broth is centrifuged at 10,000 rpm. for 20 minutes to separate a sediment from a supernatant liquid. To the sediment is added an aqueous 0.5N-NaOH solution, followed by through stirring to completely dissolve the polysaccharide portion of the sediment. The solution is then centrifuged again at 10,000 rpm. for 20 minutes to remove the cells. The solution is neutralized with a 12 percent aqueous HCl solution, whereupon the desired polysaccharide separates out as a gel. This gel fraction is collected by centriguration at 2,000 rpm. for 10 minutes, and washed twice or three times with water, followed by dehydration with acetone and drying, to give 420 mg. of PS.

On the other hand, to the supernatant obtained by centrifugation of the culture broth is added its 4-fold volume of acetone. The resulting precipitates are collected and dried to give 120 mg. of water-soluble polysaccharides.

EXAMPLE A-2

A loopful of a slant culture of *Agrobacterium radiobacter* (IFO-13127) is inoculated in 30 ml. of a seed culture medium charged in a 200 ml.-flask, the medium being composed of glucose (1.0 percent), yeast extract (1.0 percent), peptone (0.5 percent), NaCl (0.5 percent) and water and being adjusted at pH percent. Cultivation is carried out under shaking at 28°C for 24 hours, to prepare a seed culture.

A 2 ml.-portion of the seed culture is inoculated in 20 ml. of a main culture medium charged in a 200 ml.-flask, the medium being composed of sucrose (5.0%), $(NH_4)_2HPO_4$ (0.3%), $KH_2PO_4$ (0.1%), $MgSO_4·7H_2O$ (0.05%), $FeSO_4·7H_2O$ (0.005%), $MnSO_4·7H_2O$ (0.002%), $ZnCl_2$ (0.001%), $CoCl_2$ (0.001%), $CaCO_3$ (0.3%) and water and being adjusted at pH 7.2. Cultivation is carried out under shaking at 28°C for 4 days. The resultant broth is treated in the same manner as in Example A-1, to give 470 mg. of PS. The yield relative to the substrate sugar is 47.0 percent.

On the other hand, the yield of the water-soluble polysaccharide, which is similarly obtained as by-products as in Example A-1, is 115 mg.

EXAMPLE A-3

*Agrobacterium radiobacter* U-19 (IFO-13126) is cultivated in the same manner as in Example A-2. The resulting broth of the main culture is not so viscous as in that obtained in Example A-2. Upon standing, the broth gives rise to precipitates. The precipitates are collected by centrifugation at 10,000 rpm. and subjected to the same procedure for purification as in Example A-1, to give 447 mg. of PS. The yield relative to the substrate sugar is 44.7 percent.

EXAMPLE -4

*Alcaligenes faecalis* var. *myxogenes* Strain NTK-u (IFO-13140) is inoculated in 30 ml. of a seed culture medium charged in a 200 ml.-Erlenmyer flask, the medium being composed of glucose (1.0%), $(NH_4)_2HPO_4$ (0.15%), $KH_2PO_4$ (0.1%), $MgSO_4·7H_2O$ (0.05%), $FeSO_4·7H_2O$ (0.005%), $MnSO_4·7H_2O$ (0.002%), $ZnCl_2$ (0.001%), $CoCl_2$ (0.001%), yeast extract (0.1%), $CaCO3$ (0.3%), uracil (0.01. %) and water and being adjusted at Ph 7.0. Cultivation is effected under shaking at 32°C for 24 hours.

A 2 ml.-portion of the resultant seed culture broth is inoculated in 20 ml. of a main culture medium charged in a 200 ml.-creased Erlenmyer flask, the medium being composed of glucose (10.0%), $(NH_4)_2HPO_4$ (0.23%), $KH_2PO_4$ (0.1%), $MgSO_4·7H_2O$ (0.05%), $FeSO_4·7H_2O$ (0.005%), $MnSO_4·7H_2O$ (0.002%), $ZnCl_2$ (0.001%), $CoCL_2$ (0.001%), $CaCO_3$ (0.3%), uracil (0.01%) and water and being adjusted at pH 7.0. Cultivation is carried out under shaking at 32°C for 90 hours.

The broths thus obtained in several such flasks are pooled. To 80 ml. of the broth is added 240 ml. of an aqueous 0.5N-NaOH solution, followed by thorough stirring until the produced polysaccharide is swollen. To the mixture is added 160 ml. of water. The diluted solution is centrifuged at 12,000 rpm. for 10 minutes to remove the solid matters including the cells. The supernatant liquid is neutralized with a 3N-HCl, whereupon gel sediments separate. The sediments are collected by centrifugation and washed with water until the salts contained therein are removed. Then, the sediments are again centrifuged to collect the desired polysaccharide. Dehydration with acetone and drying under reduced pressure yield 4.4g. of PS. The yield relative to the substrate glucose is 55 percent.

EXAMPLE A-5

A 2-ml.-portion of the seed culture obtained in Example A-4 is transferred into 20 ml. of a main culture medium charged in a 200 ml.-creased Erlenmyer flask, the medium being composed of glucose (12.5%), $(NH_4)_2HPO_4$ (0.3%), $KH_2PO_4$ (0.1%), $MgSO_4·7H_2O$ (0.05%), $FeSO_4·7H_2O$ (0.005%), $MnSO_4·7H_2O$ (0.002%), $ZnCl_2$ (0.001%), $CoCl_2$ (0.001%), $CaCO_3$ (0.5%), uracil (0.01%) and water and being adjusted at pH 7.0. Cultivation is carried out at 32°C for 90 hours. The same purification procedure as in Example A-4 yields 4.6g. of PS. The yield relative to the glucose used is 46 percent.

EXAMPLE A-6

Four ml.-portions of the seed culture obtained in Example A-4 are transferred into six bottles containing 500 ml. each of a culture medium of which the composition is the same as that of the seed culture medium. Cultivation is carried out at 32°C for 24 hours.

The resulting culture broths are combined and are transferred into a 50-liter tank containing 30 liters of the same main culture medium as used in Example A-4. Cultivation is carried out at 32°C, under the control of the internal pressure of the tank to be held at 0.05 kg./cm² over atmospheric pressure by a limited aeration with stirring at 250 rpm. for 90 hours.

To 10 L of the culture broth is added 40 L of a 2.75 percent aqueous NaOH solution, and the mixture is stirred vigorously for 5 hours. The solution is filtered to remove the solid matters and, after the filtrate is cooled to 5°C, it is neutralized by the addition of hydrochloric acid, followed by the addition of cold water at 5°C to bring the total quantity to 275 L. The total mixture is centrifuged to collect sediments from the supernatant. The resulting polysaccharide fraction containing the sediments is again diluted with cold water at 5°C to 275 L and then centrifuged. The procedure is repeated three times, to obtain 16.5 L of a polysaccharide-containing concentrate. The concentrate is dehydrated with 100 L. each of acetone four times, followed by drying, to yield 385 g. of PS.

CHARACTERISTICS OF PS

The present polysaccharide PS which can be obtained by the above procedure invariably possesses very unique characteristics, and the PS is a tasteless, odorless, white or off-shite powder which swells upon addition of water and coagulates off-white heated.

When a 2 percent-aqueous suspension of PS is heated on a boiling water bath, it coagulates into a jelly or agarlike mass. This change is irreversible, and the properties of the mass are not affected by cooling, nor can it be dissolved in water. It will thus be seen that when a suspension of the polysaccharide is heated, it immediately forms an elastic gel. Moreover, this gelatin takes place over an extremely wide pH range, i.e. from pH about 1 to pH about 11.5.

Furthermore, this gelling property of PS is not impaired by the repetition of the alternating procedure of dissolving PS in an alkali solution and neutralizing the solution with an acid. In other words, it is possible to cause the same to gel again after neutralization and subsequent desalting.

The thus-formed gel is thermally irreversible; it will not be dissolved even if reheated. It is also stable against freezing, in contrast with the gel obtained from agar and the like which tend to undergo degradations on freezing. In addition, when the present polysaccharide is evenly suspended in, for example, alcohol-containing water or propylene glycol-containing water, or evenly admixed with various materials such as proteins, fats, carbohydrates, organic salts or inorganic salts in various concentrations together with water and the resulting suspension or mixture is heat-treated, the polysaccharide's thermal coagulability is immediately brought into action, expediently giving rise to a gel possessing excellent water-holding and flavor-binding abilities. The physicochemical properties of PS are set forth below. In the following, the samples denoted as "A" mean those produced by *Agrobacterium radiobacter* strains and ones denoted as "B" mean those produced by *Alcaligenes faecalis var. myxogenes* Strain NTK-u.

1. Specific rotation $[\alpha]_D^{22}$:
   A: $-17° \pm 3°$ (c=1.0, dimethylsulfoxide)
   $+33° \pm 6°$ (c=1.0, 0.1N-NaOH)
   B: $-16 \pm 3°$ (c=0.5, dimethylsulfoxide)
   $+31° \pm 6°$ (c=1.0, 0.1N-NaOH)

2. Average molecular weight:
   About 44,000 to about 77,000, when measured by light scattering spectrometry in dimethylsulfoxide; that is, A has average glucose units of 250 to 490, and B has average glucose units of 270 to 480, both as measured by light scattering spectrometry. On the other hand, B shows as having glucose units of $300 \pm 100$ when determined by means of periodate oxidation.

3. Elementary analysis:
   1. A: Found, C=43,28 ± 1%; H= 6.20 ± 0.5%; N=0.00%
   2. B: Found, C=43.58 ± 1%; H=6.46 ± 0.5% N=0.00%
   3. Calculated for $C_6H_{10}O_5$: C=44.44; H=6.17

4. Color reactions: Both A and B give positive reactions in Molisch test, phenol-sulfuric acid test and anthrone test.

5. Ultraviolet absorption:
   For both A and B, there is observed no significant absorption.

6. Infrared absorption:
   For both A and B, there are observed significant absorption bands at the wave numbers (cm$^{-1}$) shown below, showing the presence of the $\beta$-glucosidic bond at 890 cm.$^{-1}$:
   3600 – 3200 (S), 2950 – 2900 (M), 1640 (M), 1420 (M), 1365 (M), 1310 (Sh), 1260 (Sh), 1200 (M), 1160 (S), 1120 (Sh), 1100 (Sh), 1080 (S), 1070 (Sh), 1040 (S), 1020 (Sh), 980 (Sh), 890 (M). (In parentheses, S denotes a strong intensity, M a medium intensity, and Sh a shoulder).

7. Solubilities:
   Both A and B are soluble in an aqueous 0.5N–NaOH solution, dimethylsulfoxide or formic acid at 25°C. They are slightly soluble in aqueous ammonia, but only sparingly soluble or insoluble in plain water, ethanol or acetone.

8. Gel strength:
   Both A and B show a gel strength of $650 \times 10^3$ to $1300 \times 10^3$ dyne/cm². In view of the fact that any measured gel strength varies substantially with the conditions under which the gel is prepared and also with different methods of measurement, the gel strength shown in this specification is to be noted as having been measured under the conditions to set forth below: For both A and B, a 2.0 g. sample is made up with pure water to 100 ml. and homogenized by means of a mixer for 5 minutes. The resulting suspension is transferred to a test tube of 15 mm. in diameter, which is degassed to remove bubbles under a reduced pressure of not higher than 10 mmHg, followed by heating in a boiling water bath for 10 minutes. Then, it is cooled with cold water for 10 minutes and allowed to stand at room temperature for 30 minutes. The gel is taken out from the tube and cut into 1.0 cm. thick disc, with the uppermost layer being discarded. The pressure resistance of the gel disc against the cylinder (5.6 mm. in diameter) of a curd tension meter just before the cylinder breaks into the disc is measured and recorded in terms of a dyne scale. The resistance value recorded is taken as the gel strength (G.S.) of the specimen.

9. Stability against pH:
   Both A and B give satisfactory gel which is stable in the pH range between 2 to 9.5; even in such strongly acid pH less than 3.0 the gel is substantially as good as the gels obtainable at or near neutral, and its gel strength shows a maximum value between pH 2 and pH 3.

10. Decomposition reaction:

A specimen of A or B is treated with 70%-$H_2SO_4$ at 30°C for 1 hour. The mixture is diluted with water to 3 percent of the concentration of $H_2SO_4$. The diluted solution is subjected to hydrolysis by heating under elevated pressure. The reaction mixture is deionized by means of ion-exchange resins and the resulting neutral solution is concentrated. The concentrate is subjected to paper chromatography with use of a developed (acetic acid : butanol : $H_2O$ : 1 : 4 : 5 or 80 percent aqueous phenol) to detect solely a spot of glucose (at Rf 0.18 ± 0.02 or Rf 0.38 ± 0.02, respectively).

From the foregoing, it is clear that there is no substantial difference between "A" and "B" in every respect of the physicochemical properties. Thus, both of A and B should be understood as being PS. In those respects where measurements have rendered different numerals between A and B, the numerals of B will be taken in this specification as representing the properties of PS as a whole.

Furthermore, it is noted from the above-recited physicochemial characteristics that there are significant differences between PS and the hitherto-known samples of "curdlan" in their specific rotation, elementary analysis, gel strength (particularly at an acid pH) and so forth.

Pharmacological and nutritive studies on PS have revealed that PS is not only non-toxic, but also pharmacologically and nutritively inert like agar. The results show that PS can be taken into human bodies orally without harm to the health of hosts. The following are the examples of pharmacological tests:

1. Acute Toxicity ($LD_{50}$ in mg./kg.):

TABLE 1

| Administration | Test Animal | |
|---|---|---|
| | mice | rats |
| Oral | >10,000 | > 5,000 |
| Intraperitoneal | 2,750 | 2,750 |

2. Subacute toxicity:

Thirty Male rats (S. D./Ta strain) weighing 110 to 158g. were divided into three groups each consisting of 10 rats. The respective groups were fed diets as listed in Table 2 for 30 days. Gains in body weight and food efficiency observed are shown in Table 2.

Thereafter, the rats were sacrificed for autopsy to find no abnormal changes or differences between the PS-fed groups and control groups in heart, lungs, liver, kidneys, spleen, lymphs, thyroid, thymus, adrenal, stomach, small intestine, pancreas, testis, prostate, brain and marrow.

significant differences from control in each result (P=0.05).

2. Mean food efficiency in g. is calculated as body-weight gains per 100g. of the diet.

APPLICATION OF PS TO FOOD PREPARATION

Due to its peculiar gel-forming property and due to its non-toxic and substantially inert nature from a nutritional point of view, the new polysaccharide PS is found to be useful not only as a new food material which offers a novel type of food and new procedures of processing foods, but also as a food additive which ameliorates the qualities of a wide variety of foodstuffs, as will hereinafter be described in detail. In any case, PS is incorporated, as it is or as an admixture with another ingredient or ingredients, into food material or materials, and the resulting mixtur is subjected to a heating procedure in the presence of intermingled water in an amount sufficient to swell and gel the PS. While the useful amount of PS depends somewhat upon the purpose, the substrate and processing means, the desired effect can generally be accomplished by using approximately 0.05 to 13 percent by weight of PS relative to the finished food as served, and usually by using approximately 7 to 200 times by weight of water relative to the PS employed, with which the water is intermingled. Gellation practically occurs at a temperaure from 50°C to 200°C, but is usually effected from 80°C to 120°C, conveniently near 100°C with use of boiling water.

Firstly, the invention will be explained with reference to the instances in which PS is used as a new food material. For this purpose, PS is usually employed in an amount of about 1 to 13 percent by weight relative to the finished food as served.

As aforesaid, PS is capable of gelling over a wide pH range including about 2 to about 9.5, and, accordingly, is superior to the hitherto-known food materials of this kind. Agar gels, for example, are ustable under acid conditions below pH 4.5 and their application to agar-like foods, e.g. jelly and candies, has so far been considerably limited, due, for instance, to the restrictions that must be placed upon the amount of acids to be employed in conjunction. However, the agar-like gel obtainable by the method of this invention is extremely stable even under strongly acidic conditions, i.e. at a pH between about 2 and 3, with the result that one may apply the invention to the production of the agar-like foods which may be strongly acidic. Furthermore, there is observed a peculiar fact that the gels of PS have excellent transparency and gel strength at a strongly acid pH between 2 and 3, higher than in the case of neutral pH. This fact also contributes to the diversity of PS.' application in this field.

TABLE 2

| Diet group | Survival No. of rats | Boxy weight [1] | | | Food efficiency [2] | |
|---|---|---|---|---|---|---|
| | | Initial | Final | Gain | Treated diet | Material diet |
| Basal diet plus PS, 3% level | 10/10 | 129.4±11.4 | 369.8±20.5 | 240.4±24.6 | 36.60 | 37.73 |
| Basal diet plus OS, 10% level | 10/10 | 129.4±11.5 | 359.2±23.2 | 229.8±21.9 | 34.37 | 38.19 |
| Basal diet only (for control) | 10/10 | 129.4±10.9 | 355.9±20.1 | 226.5±25.0 | | 37.19 |

(Notes)

1. Mean body weight, body-weight gains and standard deviation are expressed in grams. There is no PS has the property to form a gel which is thermally irreversible, that is the gel once formed is not redissolved upon reheating. Therefore the gel is used in cooking applications involving boiling or baking, retaining its shpae with its viscoelasticity and excellent food qualities. This nature of PS is convenient for its use as imitation fruits for bakery use or as an improved substitute for a jelly called "konnyaku" in Japanese which is prepared from "devil's tongue" powder with water and salts and which is popular, for example, as a material for "sukiyaki" cooking.

Since, as aforesaid, PS forms a gel possessing superior freezing stability, it can be employed to advantage in the production of cold or frozen foods. Frozen foods in general were not only liable to degradation after freezing but also tend to suffer considerable drip losses upon thawing, so that reductions in shelf appeal and palatability were very often unavoidable. However, those disadvantages can be successfully eliminated by using PS as a frozen-food material in accordance with this invention. Those qualities, plus the superior impact resistance of the gel produced from PS, provide for the production of frozen foods which feature a smooth texture and good water-keeping quality.

Furthermore, because the gel obtainable from the present polysaccharide has a superior candying effect (the effect obtained by soaking in a syrup), it can be used in the preparation of fruit-like gels (the so-called imitation fruits) which are routinely used in the decoration of cakes. The fruit-like gel obtainable by the practice of this invention, when soaked in a syrup, attains a desirable texture as well as a high degree of sweetness, for it absorbs the sugars to high concentrations with accompanying dehydration. This extra sweetness, coupled with the good shape-keeping quality and elasticity of the gel, provides for the production of imitation fruits having superior food qualities. The same effect will be attained when the gel is flavored with various kinds of flavorings such as orange or lemon, and the gels once flavored tend to retain firmly the flavor in them.

Needless to say, at the time of gelatin or after gelatin, by applying suitable physical treatments such as compression, decompression, homogenization, drying and the like, it is possible to produce various foods or pasty food bodying agents which resemble konnyaku, fish roes, jelly fish, puddings or animal muscle fibers, artificial meat materials, jellies, candied imitation fruits, various dietetic foods, edible films, edible fibers and so forth. PS also affords many desirable effects in the production of gourmet foods from aquatic materials or other materials of animal origin.

In the conventional confectioner's practice, it is extremely difficult to admix an agar solution evenly with whipped egg whites. However, the superior dispersibility and affinity of PS enable one to use it in place of agar in order to easily obtain a homogeneous dispersion which, on heating, does not fail to give a glossy, superior batter.

An interesting modification of gel-formation is to produce jelly-fish-like gourmet food. When an aqueous suspension containing PS at a relatively high concentration of about 10 percent is heated on a boiling water, it forms a gel readily. If the heating is continued over 1 hour, the gel is somewhat dehydrated and turns to the jelly-fish-like gel. When flavored, the gel tastes just like the jelly-fish gourmet food.

Another modification is directed to an oily food such as sesame curd or margarin. When an aqueous suspension of PS of a relatively high concentration e.g. 1 to 5 percent is gelled under vigorous agitation together with oily substance, the mixture is emulsified and the emulsion is very stable. Thus, for example, the application of PS gives a sesame curd of a high food quality and free of retrogradation.

It will be apparent from the foregoing description that, with the use of PS, such conventional food materials as agar-agar, gelatin, pectin, konnyaku powder, casein, gluten and the like can be replaced either in part or in whole and that this invention can be carried into practice to great advantage in such applications as the production of confectionery, cooked foods and frozen foods.

In the next place, this invention will be described with particular reference to the use of PS as a food additive for the purpose of ameliorating the quality of foods. This mode of practice takes advantage of the following characteristic effects of the PS:

1. Improvements in viscoelasticity and palatability;
2. Improvements in binding quality;
3. Improvements in water holding capacity, and prevention of 'drip loss;'
4. Prevention of scorching and adhesion;
5. Prevention of objectionable odors, or preservation of aromas;
6. Shape retention in cooking;
7. Improvements in body and gloss;
8. Improvements in thickeners and stabilizers; and
9. Prevention of retrogradation in starch-containing foods.

Although the most pertinent amount of the PS varies according to the particular intended effect or purpose, said effects can be attained by using PS in an amount of about 0.05 to 3 percent by weight relative to the finished food.

When PS is used for a starch-containing food material, it is recommended to use about 0.0015 to 1 part per part of the starch contained in the food material, whereby retrogradation of the material is prevented.

The substrate foods to which PS can be applied as a food additive may include any and all types of foods which involve heating in the presence of water during the routine production process or in the course of cooking.

Among those foods are animal meat products and pasty foods based on fish flesh or animal meat, such as steamed or baked fish paste, animal meat hams such as Berliner ham, boneless ham, roast ham, etc., fish hams, mixed fish and animal meat ham, sausages including Vienna sausage, corned beef, hamburg steak, etc., artificial meats based on soybean or wheat protein, soybean curd, sesame curd, fried soybean curd, freeze-dried soybean curd, miso, sauces, ketchups, tomato juice, nectar drinks, juices, jams, marmalades, peanut butter, flour paste, bean jams, soy-cooked delicacies such as cooked beans, various gourmet foods, gravies, instant curry mixes, instant stews, instant soups, butter, margarine, cheese, syrups, candied fruits, textured protein, soy protein, spun protein, noodles, soba noodles, Chinese noodles, rice noodles, macaroni, spagetti, and other cereal flour foods, rice cake, boiled rice foods, confectioners' steamed rice, steamed rice for the production of sake, steamed rice for the production of miso, steamed wheat and other like cereals for the production of miso, rice, wheat and other like cereals for cooking use, candies, cookies, fried cakes, bavarois, marshmallows, cream puffs, corn cups and wafers for frozen confections and the like.

PS can be added as such in the course of production of food or, alternatively, it may be added in the form of a premix or a suspension in a solvent such as, for example, water, aqueous alcohol or aqueous propylene glycol, or as a paste or slurry. In view of the thermal coagulability of PS, care should generally be taken to protect PS from exposure to heat prior to its incorporation in food.

The incorporation of PS in food can be effected at an opportune time before heating in the food processing procedure. At times, it is permissible to add PS after the heating stage but not later than when the food remains sufficiently hot to allow PS to gel. Normally it is practical and expedient to add PS in a stage where, prior to heating, various materials, condiments and spices are evenly admixed together. Taking expensive varieties of hams as examples, it is convenient to add a paste or slurry of PS at the curing step or the subsequent trimming step. In the case of rice, wheat and other cereals to be cooked for consumption, the stage when, after the washing step, a predetermined quantity of water has been added in the routine manner is an opportune time. When the cereal is to be steamed, for example, in the case of steamed rice for the preparation of rice cake or sake, the material rice is washed and soaked in water and, then, PS is evenly dispersed in the water by any convenient procedure prior to routine steaming. When a kneading or pounding operation is additionally involved as in the preparation of rice cake and rice confections, PS in the form of a powder may be evenly added and dispersed in the course of kneading or pounding hot rice after steaming.

It will be apparent from the foregoing description that this invention is extremely expedient and convenient, for it does not require any special modification in the routine method, sequence and mode of operation.

This invention may be carried into practice by using in conjunction with PS in a form of premixes any suitable vehicle, solvent, food additive or other food material that is not detrimental to the practice of this invention. The ratio of PS in the premix composition can be selected in a wide range, for example, of about 1 to 99 percent by weight of PS relative to the premix. Among such compatible addenda are monosodium glutamate, sodium 5'-inosinate, sodium 5'-guanylate, alcohol, propylene glycol, phosphates, poly- or condensed phosphates, sodium alginate, casein sodium salt, cellulose sodium glycolate, starch sodium glycolate, poly(sodium acrylate), methyl cellulose, microcrystalline cellulose, dextrin, soluble starch, lactose, various vitamins including vitamin $B_1$ and vitamin C, food coloring agents, flavorings, acetic acid, vinegar and other sour materials such as citric acid, fumaric acid, malic acid, etc., sweeteners such as sucrose, glucose, honey, etc., such emulsifiers as glycerides(mono- or di-glyceride of oleic and-/or palmitic acids, for example), sugar fatty acid esters (e.g. sucrose esters with one to three higher fatty acid acyl such as palmityl and/or stearyl), and the like.

The following examples are further illustrative of this invention.

EXAMPLE B-1

Stability of PS in acid pH

1. Procedure

To 4g. of PS (polysaccharide "A") was added an aqueous solution (196 ml.) of one of the organic and inorganic acids shown below in the table to prepare a 2 percent suspension of the polysaccharide in the corresponding solution. The suspension was placed in a test tube of 15 mm. across, which was then held in a boiling water bath for 10 minutes, whereupon a gel sample was obtained.

As controls suspension of agar in 2 percent aqueous solutions of malic acid and citric acid, both of which were prepared in the same manner as above, were heated and tested.

2. Test Results

It will be seen from Table 3 that whereas the present polysaccharide A forms a firm and useful gel even under strongly acid conditions, i.e. at pH about 2 to 3, the control agar samples do not form a gel but remain to be a slurry. Similar results were obtained for polysaccharide "B."

TABLE 3

| Recipe | Gel strength ($\times 10^3$ dynes/cm$^2$) |
|---|---|
| Agar + 0.2M-Malic acid | Slimy, so cannot be measured |
| Agar + 0.2M-Citric acid | do. |
| PS only | 974 |
| PS + 0.2M-Acetic acid | 1266 |
| PS + 0.2M-Malic acid | 1015 |
| PS + 0.2M-Citric acid | 1015 |
| PS + HCl (pH 2) | 1300 |
| PS + $H_2SO_4$ (pH 2) | 1300 |
| PS + $H_3PO_4$ (pH 2) | 1300 |
| PS + 10%-Cane sugar | 970 |

EXAMPLE B-2

Candying effects

1. Procedure

Ten milliliter aliquots of a 2 percent-aqueous suspension of PS(polysaccharide A) were put in small beakers, which were then heated in a boiling water bath for 4 minutes to prepare gel samples. Ten of the gel samples were put in 100 g. of a 50 percent solution of cane sugar (10°C) and the sugar concentrations of the solution and of the gel after the immersion times set forth below in the table were measured. At the same time, the changes in weight of the gel and of the solution were respectively measured.

2. Test Results

It will be seen from Table 4 that the gel obtained from the present polysaccharide A leads to an adequate candying effect when immersed in a sugar solution for at least 6 hours. Similar results were obtained for polysaccharide B.

TABLE 4

| Immersion time (in hours) | 0 | 3 | 6 | 12 | 24 | 36 |
|---|---|---|---|---|---|---|
| Sugar concentration (gel)% | 0 | 15 | 17 | 18 | 20 | 21 |
| Sugar concentration | | | | | | |

| (sugar solution)% | 50 | 33 | 32 | 30 | 29 | 29 |
| --- | --- | --- | --- | --- | --- | --- |
| Weight change (sugar solution) | 100 | 115 | 123 | 124 | 125 | 126 |
| Weight change (gel) | 100 | 82 | 74 | 73 | 70 | 69 |

(Note) 1. Sugar concentrations were measured with a refractosaccharimeter.
2. Weight changes are shown in indexes, with the corresponding value for zero hour as 100.

EXAMPLE B-3

Effects in Boiled Noodles

1. Procedure

To 1.5 kg. of wheat flour was added 4.5 g. of PS (polysaccharide A), and the blend was processed in the routine manner to obtain boiled noodles. Thus, the blend was mechanically mixed for 5 minutes and with the addition of 480 ml. aqueous solution of sodium chloride (containing 30g. sodium chloride), it was further mixed thoroughly. Then, the system was allowed to stand for 30 minutes to obtain a dough. The dough was processed on a noodling machine, by which it was rolled three times at a roller gap of 1.4 mm., followed by noodling. The noddles were immersed in boiling water for 15 minutes and, then, cooled in cold water for 5 minutes. The resulting boiled noodles were compared with the noodles which had been prepared by the same manner as above except that PS has not been incorporated.

2. Test results

The results are set forth in Table 5. The boiled noodles prepared by the method of this invention possess superior elasticity and body and give rise to lesser amounts of dissolved out solids and, consequently, a reduced turbidity of the broth and an increased cooked weight.

Similar procedures were conducted with the concomitant use of such conventional additives as sodium polyphosphates, glycerides, sucrose fatty acid esters, gluten and the like. The results showed that those additives were not detrimental in any way to the effects of this invention. Similar results were also obtained for polysaccharide B.

TABLE 5

| No. | sample Characteristics | Control (without PS) | product of this invention |
| --- | --- | --- | --- |
| 1. | Shear strength, dyne/cm$^2$ | 762.4×10$^3$ | 878.0×10$^3$ |
| 2. | Breaking strength (parallel), dyne/cm$^2$ | 114.6×10$^3$ | 124.4×10$^3$ |
| 3. | Elongation at break (parallel) | 1.13 | 1.26 |
| 4. | Breaking strength (transverse), dyne/cm$^2$ | 83.3×10$^3$ | 95.0×10$^3$ |
| 5. | Elongation (transverse) | 0.79 | 0.94 |
| 6. | Dissolved-out solids, % | 7.6 | 5.2 |
| 7. | Weight gain, % | 2.52 | 2.80 |
| 8. | Water content of dough,% | 32.5 | 32.8 |

It was also found that the quality ameliorating effects observed on boiled noodles were also observed with boiled soba noodles, boiled Chinese noodles, fried noodles, alphatized noodles and the like.

EXAMPLE B-4

Effects in kamaboko (boarded fish paste):

Seventeen kilograms of frozen, salted chopped flesh of *Theragra chalcogramma* (pallas) was thawed and milled in a meat grinder. The milled flesh was fed to a mechanical mixer, in which it was evenly admixed with 1 kg. of potato starch, 100 g. of sodium chloride, 2 kg. of ice-water, 200 g. of sweet sake, 90 g. monosodium glutamate, and a predetermined amount of PS for approximately 30 minutes. As controls products free from PS and the products with added sorbic acid, 2-(2-furyl)-3-(5-nitro-2-furyl)acrylamide and sodium polyphosphate, respectively, were prepared in the same manner as above. The resulting kamaboko samples were compared.

In the case of control samples prepared without the addition of PS, the reduction in pH of the chopped flesh from 6.8 to 6.1 results in a significant deterioration in water holding capacity. However, in the case of the samples prepared with the addition of PS according to this invention, comparable reductions in pH do not cause such degradations.

In addition, the result of a storage test shows clearly that, in accordance with this invention, a mere adjustment of the pH of chopped flesh to the acidic side leads, without the aid of any preservative agent, to products which can be kept in as good conditions as incase of the control samples with as added preservative such as sorbic acid or 2-(2-furyl)-3-(5-nitro-2-furyl)acrylamide.

It is understood that, generally, adjustment of the pH of chopped fish flesh to the acidic side results in deteriorations in water holding capacity, jelly strength and elasticity. In the practice of this invention, however, no such deteriorations in qualities are encountered at all.

EXAMPLE B-5

Effects in sausages

1. Procedure

In the conventional manner, 5 kg. of mutton, 3 kg. of pork, 2 kg. of horse meat and 3 kg. of lard were mechanically ground and, then, fed into a silent cutter, in which the ground meat was blended with 500 g. of potato starch, 300 g. of sodium chloride, 30 g. of monosodium glutamate, 200 g. of cane sugar, 30 g. of spice, 250 g. of curing agent, 3 kg. of ice-water and the varying amount of PS set forth below in the table. After the mixture was evenly mixed in the routine manner, each product was filled into an air-permeable casing and smoked at 75°C for 30 minutes, at the end of which time it was cooled. The resulting sausages were compared with controls.

2. Test results

The test results are set forth in Table 6. It is apparent that the practice of this invention makes for a reduced loss in moisture content due to the dissipation of water during smoking and a consequent improvement in product yield.

Incidentally, in view of the fact that the firmness (T. U.) of the product increases in proportion with the amount of PS, the latter amount can be adjusted to suit the purpose, substrate, processing method and other conditions.

TABLE 6

| No. | Amount [1] of PS (weight %) | Firmness T.U.)[2] | Product yield[2] (weight %) |
| --- | --- | --- | --- |
| 1 | None (control) | 5.0 | 91.8 |
| 2 | 0.5 | 5.2 | 92.5 |
| 3 | 1.0 | 5.3 | 92.6 |
| 4 | 1.5 | 5.6 | 92.9 |
| 5 | 2.0 | 6.1 | 92.8 |

(Note) 1) The amount of polysaccharide added is based on the weight of finished meat.
2. "Product yield" is the percent ratio of each product to its weight immediately before smoking.
3. "Firmness (T.U.)" represents the texturometer units of each product as measured by the procedure of Kramer, A; Food Technology, Vol.17, pages 1596 et seq. (1963).

EXAMPLE B-6

Effects in Hamburg steak

1. Procedure

Five-hundred grams ground beef, 200 g. of butter-roasted hashed onion, 50 g. of egg, 100 g. of water, 50 g. of rusk, 0.25 g. of pepper, 0.25 g. of nutmeg, 7.5 g. of table salt and the varying amount of PS as specified below in the table were molded in the form of a cylinder, 5 cm. in diameter and 2 cm. thick, and heated in a frying pan.

The hamburg steak samples thus prepared were compared.

In a sensory test, a panel of 20 expert tasters were used and, for each attribute, the sum total of scores, each ranging from 1 to 6, were statistically analyzed. The firmness values (T.U.), which represent the texturometer readings, were obtained by the same procedure as used in Example B-5.

2. Test results

The test results are set forth in Table 7.

From Kramer's table (Kramer, A., Food Technology, 17, 1596 (1963)), which evaluates sensory test results in scores of 1 through 6 in the decreasing order of preference, the PS-free control sample gathered unfavorable scores for many attributes, e.g. 5 and 6, with the result that the sum total of the scores for the control sample was high. Thus, in terms of binding quality and firmness and in terms of palatability, the control sample was found to be unfavorable at the levels of significance of 1 percent and 5 percent, respectively.

In contrast, the hamburg steaks produced by the method of this invention were satisfactory in terms of binding quality, firmness and palatability.

In addition, the products with the addition of 1.5 percent or more of PS showed an improvement in binding quality and firmness at the 5 percent level of significance, and the increases in firmness were clearly substantiated by the texturometer readings. As to palatability, the product obtained with the addition of 0.5 percent of PS was preferred at the 1 percent level of significance, but the product obtained with 2 percent of PS was disliked at the 5 percent level of significance.

In terms of palatability, the polysaccharide-free control sample was also disliked at the 5 percent level of significance. Therefore, it was concluded that so far as Hamburg steak was concerned, the level of addition from approximately 0.3 to 1.0 percent was effective.

TABLE 7

| No. | Amount of PS % | Sensory test binding quality | firmness | palatability | firmness (T.U.) |
|---|---|---|---|---|---|
| 1 | None | 94** | 97** | 90* | 3.5 |
| 2 | 0.3 | 85 | 85 | 68 | 3.6 |
| 3 | 0.5 | 66 | 67 | 46** | 3.7 |
| 4 | 1.0 | 77 | 75 | 54 | 3.9 |
| 5 | 1.5 | 51* | 50* | 70 | 5.1 |
| 6 | 2.0 | 47** | 46** | 92* | 6.0 |

(Note) 1. * denotes that the level of significance is 5%; ** denotes that the level of significance is 1%.
2. The 'amount of PS' is based on the weight of finished mix prior to heating.

EXAMPLE B-7

Gel stability against temperature

1. Procedure

The gel prepared in the same manner as described in Example B-1 was frozen at a temperature of about −20° and thawed at room temperature to evaluate the freezing stability of the gel.

Separately, portions of the above-prepared gel were heated at 100°C and 115°C, respectively, for 30 minutes and their stabilities were observed.

2. Test results

The test results are summarized in Table 8. It is clearly seen that the gel obtained from PS is extremely stable against freezing and high-temperature treatment. Similar results were obtained for polysaccharide B.

TABLE 8

| No. | Conditions of treatment | Gel strength ($\times 10^3$ dyne/cm$^2$) |
|---|---|---|
| 1 | before freezing | 950 |
| 2 | frozen and thawed | 948 |
| 3 | heated at 100°C for 30 min. | 952 |
| 4 | heated at 115°C for 30 min. | 1070 |

EXAMPLE B-8

Three-hundred grams of butter is put in a bowl and externally heated in a water bath to a creamy state. It is stirred well with the addition of 240 g. of granular sugar and 3 egg yolks, followed by the addition of a small amount of lemon essence. The mix is blended with a homogeneous mixture of 450 g. of wheat flour and 9 g. of PS. The resulting dough is spread evenly with a rolling pin and stamped to size. The stampings are baked in an oven for about 8 minutes. The procedure gives about 980 g. of cookies.

EXAMPLE B-9

One hundred grams of starch is evenly blended with 12g. of PS in powdery condition, followed by the addition of 135g. cane sugar and 500 ml. water. The mixture is stirred well until a homogeneous suspension is obtained. Two-thirds of the volume of the above suspension are put in a pan and, with stirring, heated until the mixture becomes transparent, at which moment the heating is stopped.

Then, the remaining one-third of the suspension is added and stirred to obtain approximately 750g. of semifinished jelly (kuzumochi in Japanese) which is in semipaste condition. Then, bean jam is wrapped in this semifinished jelly and the wrapped product is steamed in a steam box for about 5 minutes.

The resulting product features, inter alia, a good adhesion between the wrapping and jam and has an elasticity approaching that of a rice cake.

EXAMPLE B-10

To 390 ml. of milk is added 20 g. of PS, and the mixture is evenly blended in a mixer in the routine manner. With the addition of 80 g. of egg (whole egg), 140 g. of cane sugar and a small amount of vanilla essence, the blend is further stirred for approximately 5 minutes.

The mix is passed through a filter and dispensed into vessels of about 20 to 30 ml. capacity, followed by steaming for approximately 7 minutes. The procedure yields approximately 600 g. of cream jelly.

EXAMPLE B-11

To 750 g. fresh cream is added 2,500 g. of unpasteurized milk and the mixture is heated at 55°C for 30 minutes, followed by the addition of 10 g. of PS, 1,500 g. of defatted condensed milk, 220 g. of cane sugar, 10 g. of sucrose palmitate and 15 g. of stabilizer. The mixture thus prepared is pasteurized, homogenized and frozen to obtain approximately 5,000 g. of ice-cream.

EXAMPLE B-12

One hundred and sixty g. of egg white is whipped and then, stirred with the addition of 250 g. of cane sugar and a small amount of vanilla essence. To the mixture is added a homogeneous suspension of 25 g. of PS in 475 ml. of water, followed by gentle stirring. Then, the mixture is poured into vessels and heated in a steam box for about 20 minutes, at the end of which time it is taken out and allowed to cool at room temperature. Finally, it is chilled in a refrigerator to obtain approximately 900 g. of a confection.

EXAMPLE B-13

Three-hundred grams of stored rice having a characteristic stale rice odor is routinely washed with water and allowed to drain, followed by the addition of water to a total weight, of approximatley 750g. To this, there is added 3.0 g. of PS and the mixture is stirred to an even suspension, and then boiled in an electric rice cooker to obtain approximately 710 g. of boiled rice. This boiled rice has no characteristic odor of stale rice, nor is it so fragile as stale rice.

Furthermore, it is highly fluffy and elastic, and has good taste and chewiness.

EXAMPLE B-14

Approximately 30g. of PS is blended with 270 ml. of water and the blend is stirred well to prepare a paste. The paste is poured into a suitable vessel and steamed in a steam bod for 60 minutes. The resulting gel is taken out, allowed to cool at room temperature and cut to size. The procedure gives 290 g. of a food of which appearance, taste and chewiness resemble those of jelly fish.

During the above process, the transparency of the food may be adjusted by adding 1 to 2 g. of calcium carbonate in the mixing state.

EXAMPLE B-15

Thirty-five grams of PS, 250 g. of konnyaku powder and 1900 ml. of water are stirred to an even blend, which is allowed to stand for 10 minutes.

The blend is then homogenized in a mixer for 10 minutes, followed by the addition of a homogeneous suspension of 3 g. of calcium hydroxide in 200 ml. of water.

The mixture is quickly stirred and kneaded, followed by dispension into vessels of heat resistant glass, which are then heated in a steam box for 1 hour. The vessels are taken out and cooled in cold water, whereupon 2 kg. of konnyaku is obtained.

EXAMPLE B-16

Six kg. of pork, 2 kg. of horse meat and 7 kg. of mutton, which have been routinely cured and allowed to mature, are fed into a ham mixer, to which 600 g. of PS is further added. After the ingredients are ground to a blend, 400 ml. of water, 160 g. of a mixture of spices, 40 g. of a condiment and 25 g. of smoke crystals are added. The blend is further mixed and filled into synthetic resin casings, which are then sealed.

The sealed packages are sterilized by heating at 80°C for 90 minutes and allowed to cool. The procedure yields 16 kg. of Berliner ham.

EXAMPLE B-17

The muscle fibers of 10 kg. of beef, which has been cured and steamed, are disintegrated and fed into a mixer, to which 20 g. of PS, 2.5 kg. of broth, 3 kg. of beef tallow, 100 g. of glyceride, 20 g. of monosodium glutamate, 50 g. of cane sugar, 30 g. of pepper, 10 g. of all spice and 20 g. of onion powder are added. The ingredients are evenly mixed together and the resulting blend is filled into a can which is clinched and sterilized in a retort a 120° for 60 minutes, followed by cooling. The procedure yields 15 kg. of (canned) corned beef.

EXAMPLE B-18

Ten grams of PS is blended with 100 ml. of water and the bland is homogenized to a pasty mass. In the paste, pork chops of suitable size are dipped in the conventional manner to let the paste adhere to the chops, whereby each chop is wrapped in a thin film of the paste, followed by rolling in rusk. The chops are then fried at about 170°C for approximately 4 minutes. The procedure yields fried pork chops having a sumptuous flavor.

EXAMPLE B-19

To a mixture of 3 kg. of PS, 40 kg. of cane sugar, 500 g. of citric acid, 200 g. of sodium tripolyphosphate and 100 g. of guar gum, there is added 200 L. of water. The aqueous suspension is thoroughly stirred and then spray-dried to obtain a jelly premix of 8 percent water content.

This premix is associated with its 2- to 4-fold weight of water, and after agitation, the suspension is heated in an electronic oven for 30 seconds, whereupon a delicious jelly is instantly prepared.

EXAMPLE B-20

To 990 g. of PS are added 3 g. of sodium tripolyphosphate,[1] 5 g. of stearyl monoglyceride and 2 g. of sodium glutamate and the mixture is blended to give a konnyaku premix.

Upon its use, this premix is associated with its 50-to 100 -fold weight of water and the suspension is heated near 100°C for 10 min. to give a palatable konnyaku-like gel instantly.

EXAMPLE B-21

A 1 percent-aqueous suspension of PS is heated at about 100°C under vigorous agitation to give a viscons liquid. To 4 L. of the liquid are added 3 L. of corn oil, 1 L. of grain vinegar and desired amounts of cane sugar, table salt flavorings and egg yolk 2), and the whole mixture is vigorously agitated to give a well-emulsified salad dressing.

What we claim is:

1. A method for producing an improved foodstuff, which comprises incorporating a gelable β-1,3-glucan polysaccharide PS of the following characteristics:
    1. Specific rotation $[\alpha]_D^{22}$ being:
        −16° ± 3° (c=0.5, dimethylsulfoxide)

$+31° \pm 6°$ (c=1.0, 0.1N-NaOH);
2. Average molecular weight, measured by light scattering spectrometry, being from about 44,000 to about 77,000;
3. Elementary analysis being:
C, 43.58% ± 1%; H, 6.46% ± 0.5%; N, 0.00%;
4. Positive color reactions in Molisch test, phenolsulfuric acid test and anthrone test;
5. Exhibiting no significant absorption band in its ultraviolet absorption spectrum;
6. Infrared absorption spectrum exhibiting significant absorption bands at the wave numbers ($cm^{-1}$):
3600–3200, 2950–2900, 1640, 1420, 1365, 1310, 1260, 1200, 1160, 1120, 1100, 1080, 1070, 1040, 1020, 980 and 890;
7. Soluble at 25°C in an aqueous 0.5N-NaOH solution, dimethylsulfoxide or formic acid; slightly soluble in aqueous ammonia; but sparingly soluble or insoluble in plain water, acetone or ethanol;
8. Gelable by heating in the presence of water, forming a gel; and
9. The gel, formed by heating its 2 percent aqueous suspension, being stable in the pH range from 2 to 9.5; and exhibiting a gel strength of from $650 \times 10^3$ to $1300 \times 10^3$ dyne/$cm^2$, measured by the method specified in the description.

and water into the food material, the amount of PS relative to the finished food as served being about 0.05 to 13 percent by weight, and then subjecting the mixture to heating procedure.

2. The method according to claim 1, wherein the finished food as served contains water in an amount of about 7 to 200 times as much weight as the PS contained therein.

3. The method according to claim 1, wherein the finished food contains starch, annd the amount of the PS to be incorporated is about 0.0015 to 1 part per part of the starch contained in the finished food.

4. A foodstuff composition, which comprises water and 0.05 to 13 percent of a gelable $\beta$-1,3-glucan polysaccharide PS of the following characteristics:
1. Specific rotation $[\alpha]_D^{22}$ being:
$-16° \pm 3°$ (c=0.5, dimethylsulfoxide)
$-31° \pm 6°$ (c=1.0, 0.1N-NaOH);
2. Average molecular weight, measured by light scattering spectrometry, being from about 44,000 to about 77,000;
3. Elementary analysis being:
C, 43.58% ± 1%; H, 6.46% ± 0.5%; N, 0.00%;
4. Positive color reactions in Molisch test, phenolsulfuric acid test and anthrone test;
5. Exhibiting no significant absorption band in its ultraviolet absorption spectrum;
6. Infrared absorption spectrum exhibiting significant absorption bands at the wave numbers ($cm^{-1}$):
3600–3200, 2950–2900, 1640, 1420, 1365, 1310, 1260, 1200, 1160, 1120, 1100, 1080, 1070, 1040, 1020, 980, and 890;
7. Soluble at 25°C in an aqueous 0.5N-NaOH solution, dimethylsulfoxide or formic acid; slightly soluble in an aqueous ammonia; but sparingly soluble or insoluble in plain water, acetone or ethanol;
8. Gelable by heating in the presence of water, forming a gel; and
9. The gel, formed by heating its 2 percent aqueous suspension, being stable in the pH range from 2 to 9.5; and exhibiting a gel strength of from about $650 \times 10^3$ to $1300 \times 10^3$ dyne/$cm^2$, measured by the method specified in the description; relative to the finished food as served.

5. The foodstuff composition according to claim 4, wherein the amount of the water is about 7 to 200 times as much weight as the PS contained in the finished food as served.

6. The foodstuff composition according to claim 4, wherein the composition is a thermo-irreversible gel comprising about 1 to 13 percent by weight of the PS relative to the finished food as served.

7. The foodstuff composition according to claim 4, wherein the composition contains starch and the amount of the PS to be incorporated is about 0.0015 to 1 part per part of the starch contained.

* * * * *